United States Patent
Wybenga et al.

(10) Patent No.: US 7,362,754 B2
(45) Date of Patent: Apr. 22, 2008

(54) APPARATUS AND METHOD FOR MAINTAINING PACKET SEQUENCING IN A PARALLEL ROUTER

(75) Inventors: Jack C. Wybenga, Plano, TX (US); Pradeep D. Samudra, Plano, TX (US); Patricia K. Sturm, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 10/655,149

(22) Filed: Sep. 4, 2003

(65) Prior Publication Data

US 2005/0053080 A1    Mar. 10, 2005

(51) Int. Cl.
*H04L 12/28* (2006.01)
(52) U.S. Cl. ...................................... 370/389
(58) Field of Classification Search ................ 370/389, 370/396, 360, 386
See application file for complete search history.

(56) References Cited

U.S. PATENT DOCUMENTS

2003/0202511 A1*  10/2003  Sreejith et al. ............. 370/389

\* cited by examiner

*Primary Examiner*—Seema S. Rao
*Assistant Examiner*—Wanda Z Russell

(57) ABSTRACT

A router for interconnecting N interfacing peripheral devices. The router comprises: i) a first switch fabric; ii) a second switch fabric; and iii) a plurality of routing nodes coupled to the first and second switch fabrics. Each of the routing nodes comprises an input-output processing (IOP) module for forwarding received data packets to other ones of the IOP modules via the first and second switch fabrics. A first one of the IOP modules forwards received data packets directed to a second one of the IOP modules by alternating between the first and second switch fabrics for each sequential data packet directed to the second IOP module. Breaks in the alternating sequence identify failed links and cause all traffic to be sent via the remaining good link. Support for multiple IOP modules and switch fabrics also is provided.

24 Claims, 3 Drawing Sheets

| TRANSACTION NO. | SOURCE IOP | DESTINATION IOP | SWITCH FABRIC | PACKET SIZE (NO. OF BYTES) |
|---|---|---|---|---|
| 301 | IOP 3 | IOP 2 | A | 256 |
| 302 | IOP 3 | IOP 5 | A | 64 |
| 303 | IOP 3 | IOP 5 | B | 1500 |
| 304 | IOP 3 | IOP 5 | A | 64 |
| 305 | IOP 3 | IOP 5 | B | 64 |
| 306 | IOP 3 | IOP 2 | B | 128 |
| 307 | IOP 3 | IOP 4 | A | 256 |
| 308 | IOP 3 | IOP 2 | A | 64 |
| 309 | IOP 3 | IOP 2 | B | 64 |
| 310 | IOP 3 | IOP 4 | B | 512 |
| 311 | IOP 3 | IOP 4 | A | 64 |
| 312 | IOP 3 | IOP 5 | A | 64 |
| 313 | IOP 3 | IOP 5 | B | 256 |
| 314 | IOP 3 | IOP 5 | A | 256 |

FIG. 3

APPARATUS AND METHOD FOR MAINTAINING PACKET SEQUENCING IN A PARALLEL ROUTER

TECHNICAL FIELD OF THE INVENTION

The present invention relates to massively parallel routers and, more specifically, to a mechanism for maintaining packet sequencing in a parallel router.

BACKGROUND OF THE INVENTION

The growth of the Internet during the 1990s was the driving force behind the three generations of Internet Protocol (IP) routers. The development is underway of fourth generation routers, which include more optics and a higher degree of parallelism. While Internet bandwidth is no longer growing at triple digit rates, it is still growing at a respectable 60-70% per year. This is a seemingly sustainable growth, which exceeds Moore's law by a significant margin.

To match this demand, vendors are delivering faster IP core routers that implement optical interfaces and electronic switching matrices to accommodate the inexorable growth in Internet traffic. The next evolution of the core network has an IP layer at the edge of a circuit-switched optical layer based on wave division multiplexing (WDM) circuits with optical cross connects. However, there is reason to be concerned about the ability of primarily electronic IP routers to keep pace with the bandwidth growth provided by the switched optical layer.

A packet switch that is fully optical requires a technological evolution that is currently just a promise. Many of the enabling technologies are still in the stage of research and experimentation. So, while optical switching may be deployed in the future, it is not expected to come soon enough to handle nearer term bandwidth needs. Thus, there will be a gap between Internet bandwidth needs and the bandwidth capabilities of primarily electronic IP routers before 100% optical packet switches become practical. In the near term, switch routers have the option of being simpler, using more optics, and taking advantage of increased parallelism.

However, the issue of maintaining packet sequencing in fourth generation routers is becoming more problematic. Most conventional high performance packet switches use input queuing and a non-blocking (e.g., crossbar) switch fabric. Thin input queues are arranged as virtual output queues (VOQs) to overcome head of line blocking and to enable high throughput rates. To simplify the task of memory management, a fixed-sized time slot is used. This requires the segmenting of incoming variable length packets into fixed-sized cells. A centralized scheduler examines each slot of the VOQ to determine the configuration of the switch fabric for the next time slot. These switch fabrics generally have a scheduler-based forwarding mechanism. A hot standby mode switch fabric provides redundancy.

There has been significant work in the area of parallel operating switch fabrics. However, there has been limited work on maintaining packet sequencing in systems using such parallel operating switch fabrics. In 2001, Iyer and McKeown suggested using a line buffer to reorder mis-sequenced data packets. In June 2002, Keslassy and McKeown proposed a "full frames first" (FFF) mechanism that eliminates the sequencing buffer by avoiding data packet mis-sequencing. The FFF mechanism uses a three-dimensional variant of the virtual output queue and a set of deterministic sequences that connect inputs to outputs to achieve this feat. However, all of the proposed solutions are complex and hardware intensive, thus increasing the cost of the routers and decreasing their reliability.

Therefore, there is a need in the art for an improved Internet protocol (IP) router. In particular, there is a need for a massively parallel, distributed architecture router that is capable of minimizing the occurrence of out-of-sequence transmission of data packets from the router.

SUMMARY OF THE INVENTION

To address the above-discussed deficiencies of the prior art, it is a primary object of the present invention to provide a router for interconnecting N interfacing peripheral devices. According to an advantageous embodiment of the present invention, the router comprises: i) a first switch fabric; ii) a second switch fabric; and iii) a plurality of routing nodes coupled to the first and second switch fabrics, each of the routing nodes comprising an input-output processing (IOP) module capable of forwarding received data packets to other ones of the IOP modules via the first and second switch fabrics, wherein a first one of the IOP modules forwards received data packets directed to a second one of the IOP modules by alternating between the first and second switch fabrics for each sequential data packet directed to the second IOP module.

According to one embodiment of the present invention, the first IOP module forwards received data packets directed to a third one of the IOP modules by alternating between the first and second switch fabrics for each sequential data packet directed to the third IOP module.

According to another embodiment of the present invention, the alternate selection of the first and second switch fabrics for forwarding of data packets between the first and second IOP modules is independent of the alternate selection of the first and second switch fabrics for forwarding of data packets between the first and third IOP modules.

According to still another embodiment of the present invention, the second IOP module is capable of determining that a next expected data packet from the first IOP module was not received in an alternating manner from the first and second switch fabrics.

According to yet another embodiment of the present invention, the second IOP module, in response to the determination that the next expected data packet from the first IOP module was not received in an alternating manner from the first and second switch fabrics, determines that one of the first and second switch fabrics is faulty and ceases forwarding data packets to the first IOP module via the faulty one of the first and second switch fabrics.

According to a further embodiment of the present invention, the first IOP module is capable of determining that a next expected data packet from the second IOP module was not received from the faulty one of the first and second switch fabrics and, in response to the determination, the first IOP module ceases forwarding data packets to the second IOP module via the faulty one of the first and second switch fabrics.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 illustrates the selection of switch fabrics for the transmission of data packets between pairs of IOP modules in the exemplary distributed architecture router according to one embodiment of the present invention.

DETAILED DESCRIPTION OF THE INVENTION

Figure 1:
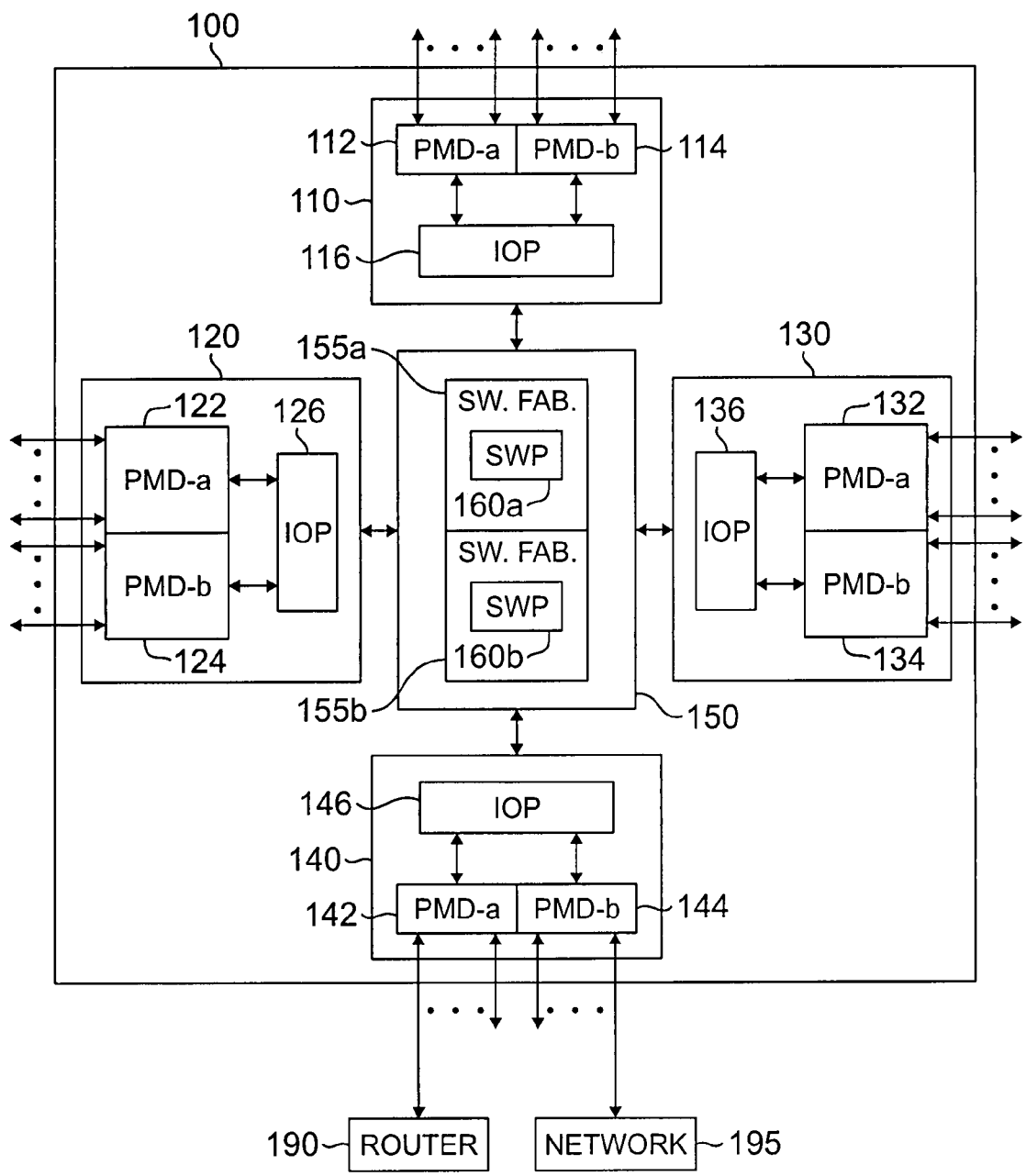
FIG. 1 illustrates an exemplary distributed architecture router, which implements packet sequencing according to the principles of the present invention.
Figure 2:
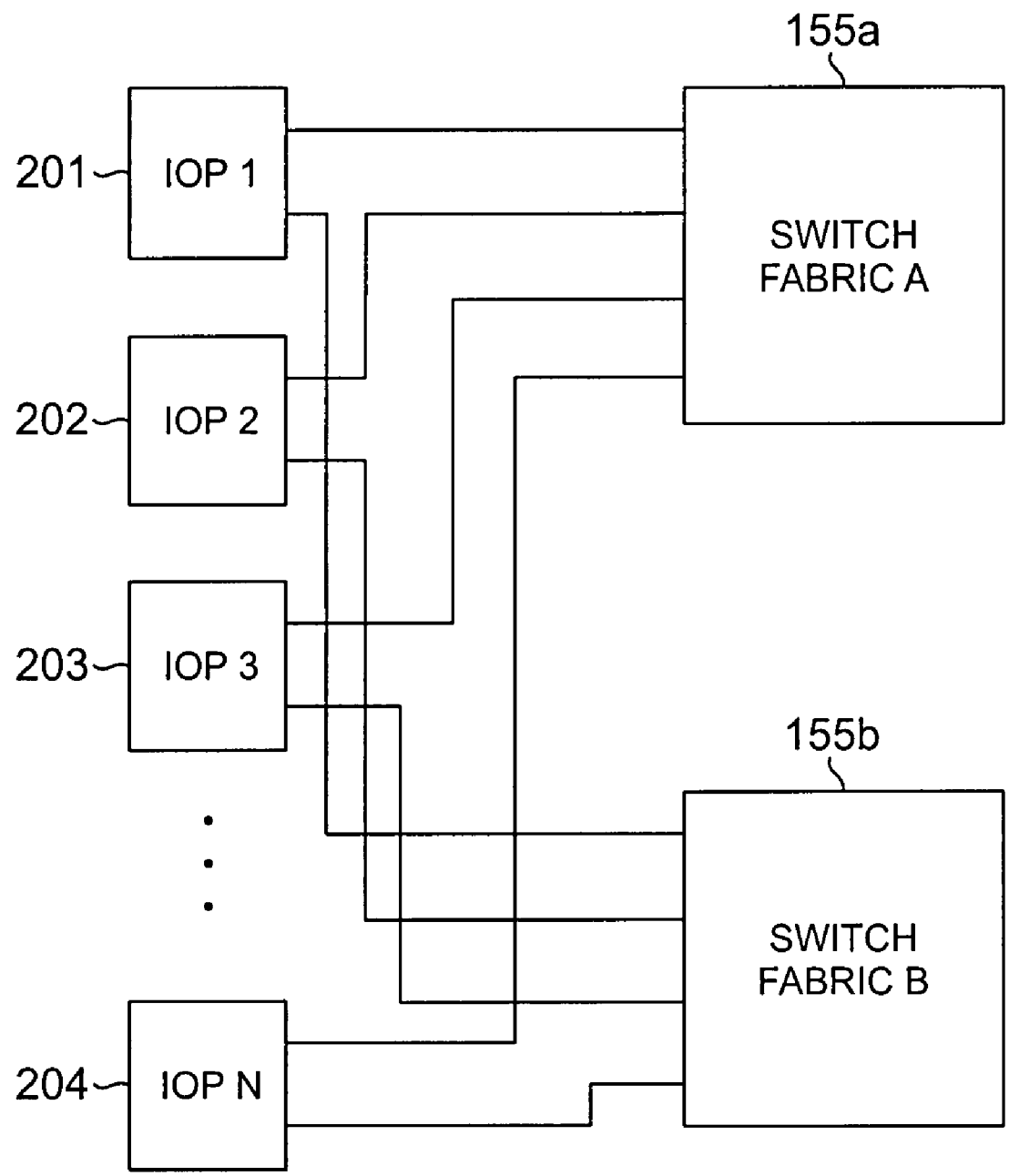
FIG. 2 illustrates the routing of data packets between IOP modules in the distributed architecture router according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

FIG. 1 illustrates exemplary distributed architecture router 100, which implements packet sequencing according to the principles of the present invention. Distributed architecture router 100 provides scalability and high-performance using up to N independent routing nodes (RN), including exemplary routing nodes 110, 120, 130 and 140, connected by switch 150, which comprises a pair of high-speed switch fabrics 155a and 155b. Each routing node comprises an input-output processor (IOP) module, and one or more physical medium device (PMD) module. Exemplary RN 110 comprises PMD module 112 (labeled PMD-a), PMD module 114 (labeled PMD-b), and IOP module 116. RN 120 comprises PMD module 122 (labeled PMD-a), PMD module 124 (labeled PMD-b), and IOP module 126. RN 130 comprises PMD module 132 (labeled PMD-a), PMD module 134 (labeled PMD-b), and IOP module 136. Finally, exemplary RN 140 comprises PMD module 142 (labeled PMD-a), PMD module 144 (labeled PMD-b), and IOP module 146.

Each one of IOP modules 116, 126, 136 and 146 buffers incoming Internet protocol (IP) frames and MPLS frames from subnets or adjacent routers, such as router 190 and network 195. Additionally, each of IOP modules 116, 126, 136 and 146 classifies requested services, looks up destination addresses from frame headers, and forwards frames to the outbound IOP module. Moreover, each IOP module also maintains an internal routing table determined from routing protocol messages and provisioned static routes and computes the optimal data paths from the routing table. Each IOP module processes an incoming frame from one of its PMD modules. According to one embodiment of the present invention, each PMD module frames an incoming frame (or cell) from an IP network (or ATM switch) for processing in an IOP module and performs bus conversion functions.

Each one of routing nodes 110, 120, 130, and 140, configured with an IOP module and PMD module(s) and linked by switch fabrics 155a and 155b, is essentially equivalent to a router by itself. Thus, distributed architecture router 100 can be considered a set of RN building blocks with high-speed links (i.e., switch fabrics 155a and 155b) connected to each block. Switch fabrics 155a and 155b support frame switching between IOP modules. Switch processor (SWP) 160a and switch processor (SWP) 160b, located in switch fabrics 155a and 155b, respectively, support system management.

FIG. 2 illustrates the routing of data packets between exemplary IOP modules in distributed architecture router 100 according to one embodiment of the present invention. As stated above, there are N routing nodes (RNs) in router 100 and each node contains an IOP module. FIG. 2 illustrates the interconnections between switch fabrics 155a and 155b and the N IOP modules, including exemplary IOP modules 201-204. IOP modules 201-204 are arbitrarily labeled IOP 1, IOP 2, IOP 3, and IOP N. Switch fabrics 155a and 155b are labeled Switch Fabric A and Switch Fabric B, respectively.

It is noted that the embodiment of router 100 shown in FIGS. 1 and 2 contains only two switch fabrics. However, this is by way of illustration only and should not be construed to limit the scope of the present invention. In alternate embodiments of the present invention, router 100 may contain three, four or more switch fabrics. The switch fabrics of router 100 may be referred to hereafter as Switch Fabric A, Switch Fabric B, Switch Fabric C, Switch Fabric D, and so forth. However, in an advantageous embodiment of the present invention, two switch fabrics are sufficient to provide a redundant configuration.

Router 100 differs from conventional router architectures for two fundamental reasons. First, router 100 uses Ethernet technology that relinquishes any control of switch 150. Secondly, there is a requirement for redundancy. The parallel load shared switch fabric of router 100 pathologically missequences data packets because router 100 permits variable length packets. The present invention resolves this problem by creating a relationship between each source-destination pair of IOP modules.

According to the principles of the present invention, each IOP module maintains an index of the range equivalent to the number of redundant switch fabrics permitted, for each adjacent IOP. For example, router 100 may use a binary table of length 0-255 in an implementation that permits 256 IOP modules and has two switch fabrics. A given source IOP module sends data packets to the destination IOP module via the switch fabrics using a round-robin algorithm. Thus, if four switch fabrics are used (e.g., Switch Fabric A, Switch Fabric B, Switch Fabric C, and Switch Fabric D), then data packets are sent A B C D A B C D . . . from the source IOP module to the destination module. Thus, the IOP module selects the switch fabric for the next data packet to be transmitted based on the destination IOP module.

In the case of a two switch fabric router, the round-robin algorithm causes data packets sent from IOP j to IOP k to alternate between a primary switch fabric (i.e., Switch Fabric A) and a secondary switch fabric (i.e., Switch Fabric B), so that the switch fabrics are selected as ABABABA . . . . Data packets sent to the same destination IOP module may be interspersed with data packets being sent to different destination IOP modules. However, the round robin sequence for each pair of source and destination IOP modules is maintained separately.

For example, FIG. 3 illustrates the selection of switch fabrics for the transmission of data packets between pairs of IOP modules in exemplary distributed architecture router 100 according to one embodiment of the present invention. In FIG. 3, data packets are sent from a single source IOP module (i.e., IOP 3) to three different destination IOP modules (i.e., IOP 2, IOP 4, and IOP 5). The transmission of each data packet is listed as one of transactions 301-314. As FIG. 3 shows, router 100 maintains a separate round robin algorithm for each destination IOP module.

For example, transactions 301, 306, 308 and 309 are transmissions between IOP 3 and IOP 2. Switch Fabric A and Switch Fabric B are selected in the order [ABAB . . . ] for transactions 301, 306, 308 and 309, despite the interleaving of transactions 302-305 and 307. Similarly, transactions 302-305 are transmissions of data packets between IOP 3 and IOP 5. Switch Fabric A and Switch Fabric B are selected in the order [ABAB . . . ] for transactions 302-305.

Therefore, each destination (or receiving) IOP module expects that the traffic sequence from each source (or transmitting) IOP module will follow a sequence [ABABAB . . . ] for a two switch fabric configuration. Similarly, in a three switch fabric router, each receiving IOP module expects that the traffic sequence from each transmitting IOP module will follow a sequence [ABCABCABC . . . ]. Likewise, in a four switch fabric router, each receiving IOP module expects that the traffic sequence from each transmitting IOP module will follow a sequence [ABCDABCD . . . ]. It should be noted that the sequence may begin anywhere, so that a [BABABA . . . ] sequence is considered identical to [ABABAB . . . ]. The destination IOP module forwards data packets out the network interface ports alternately from each switch fabric.

If all packets were identical in length, as in the case of a cell-based system, and input port contentions were minimized or eliminated, router 100 could use this behavior to mitigate the mis-sequencing of data packets. However, variable packet lengths (e.g., between 64 and 1524 bytes) and the probability of input contention on any given IOP switch fabric interface result in significant packet variability. In FIG. 3, exemplary packet sizes are shown for each data packet sent to IOP 5 from IOP 3. In this case, a large packet (1500 bytes) is sent among several small packets. The second packet through switch A (transaction 304) should arrive at IOP 5 prior to the first packet through switch B (transaction 303). In this case, the second packet from Switch A must be buffered while awaiting the first packet from switch B, so that packet order is maintained on the packets output to the network ports.

Using a 1 Gigabit Ethernet switch fabric as an example, the packet delay would range between 0.512 microseconds and 12.192 microseconds. Assuming a worst case condition in which a maximum length packet is sent between two minimum length packets in the face of asymmetric input port congestion at the destination IOP module, a delay of $3\sigma(P_{lmax}-P_{lmin})$ can be assumed, where $P_{lmax}$ and $P_{lmin}$ are the maximum and minimum packet sizes and the three sigma ($3\sigma$) point of the traffic distribution is assumed. Thus, a delay of around 35 microseconds, or about 70 minimum length packets, could reasonably be assumed.

In addition to providing a mechanism for sequencing packets across a load-shared switch fabric, the present invention can provide failure detection in the switch fabric path between the source IOP module and the destination IOP module. If the receiving IOP module detects a sequence failure, the assumption is that it is the result of a switch fabric failure or a failure of the associated optics. When a receiving IOP module detects the loss of traffic on a particular channel, it stops sending to the source IOP module on the faulty switch fabric and forwards all traffic to that source IOP module via the remaining switch fabrics. For example, the loss of traffic from Switch Fabric A for a specified interval causes the receiving IOP module to stop forwarding traffic on Switch Fabric A and to forward all of the traffic to that IOP module via Switch Fabric B. The source IOP module will then independently decide that Switch Fabric A is faulty.

According to the principles of the present invention, the source and destination IOP module pairs use redundant switch fabrics in a round robin fashion to provide a mechanism for maintaining packet sequencing through the distributed architecture of router 100. Advantageously, this scheme requires packet buffering of a reasonably small size in the IOP modules. Thus, router 100 permits multiple switch fabrics to be used in a load-sharing manner. Router 100 detects any departure from the normal round-robin sequencing, thereby permitting the failed switch fabric routes to be dropped.

Although the present invention has been described with an exemplary embodiment, various changes and modifications may be suggested to one skilled in the art. The present invention is intended to encompass such changes and modifications as fall within the scope of the appended claims.

What is claimed is:

1. A router for interconnecting a plurality of interfacing peripheral devices, said router comprising:
    a first switch fabric;
    a second switch fabric; and
    a plurality of routing nodes coupled to said first and second switch fabrics, each of said routing nodes comprising an input-output processing (IOP) module capable of forwarding received data packets to other ones of said IOP modules via said first and second switch fabrics, wherein a first one of said IOP modules forwards received data packets directed to a second one of said IOP modules by alternating between said first and second switch fabrics for each sequential data packet directed to said second IOP module.

2. The router as set forth in claim 1 wherein said first IOP module forwards received data packets directed to a third one of said IOP modules by alternating between said first and second switch fabrics for each sequential data packet directed to said third IOP module.

3. The router as set forth in claim 2 wherein said alternate selection of said first and second switch fabrics for forwarding of data packets between said first and second IOP modules is independent of said alternate selection of said first and second switch fabrics for forwarding of data packets between said first and third IOP modules.

4. The router as set forth in claim 3 wherein said second IOP module is capable of determining that a next expected data packet from said first IOP module was not received in an alternating manner from said first and second switch fabrics.

5. The router as set forth in claim 4 wherein said second IOP module, in response to said determination that said next expected data packet from said first IOP module was not received in an alternating manner from said first and second switch fabrics, determines that one of said first and second switch fabrics is faulty and ceases forwarding data packets to said first IOP module via said faulty one of said first and second switch fabrics and forwards all subsequent data packets to said first IOP module via the other one of said first and second switch fabrics.

6. The router as set forth in claim 5 wherein said first IOP module is capable of determining that a next expected data packet from said second IOP module was not received from said faulty one of said first and second switch fabrics and, in response to said determination, said first IOP module ceases forwarding data packets to said second IOP module via said faulty one of said first and second switch fabrics and forwards all subsequent data packets to said second IOP module via the other one of said first and second switch fabrics.

7. A communication network comprising a plurality of routers capable of transmitting data packets to and receiving data packets from each other and from interfacing peripheral devices associated with said communication network, each of said plurality of routers comprising:
 a first switch fabric;
 a second switch fabric; and
 a plurality of routing nodes coupled to said first and second switch fabrics, each of said routing nodes comprising an input-output processing (IOP) module capable of forwarding received data packets to other ones of said IOP modules via said first and second switch fabrics, wherein a first one of said IOP modules forwards received data packets directed to a second one of said IOP modules by alternating between said first and second switch fabrics for each sequential data packet directed to said second IOP module.

8. The communication network as set forth in claim 7 wherein said first IOP module forwards received data packets directed to a third one of said IOP modules by alternating between said first and second switch fabrics for each sequential data packet directed to said third IOP module.

9. The communication network as set forth in claim 8 wherein said alternate selection of said first and second switch fabrics for forwarding of data packets between said first and second IOP modules is independent of said alternate selection of said first and second switch fabrics for forwarding of data packets between said first and third IOP modules.

10. The communication network as set forth in claim 9 wherein said second IOP module is capable of determining that a next expected data packet from said first IOP module was not received in an alternating manner from said first and second switch fabrics.

11. The communication network as set forth in claim 10 wherein said second IOP module, in response to said determination that said next expected data packet from said first IOP module was not received in an alternating manner from said first and second switch fabrics, determines that one of said first and second switch fabrics is faulty and ceases forwarding data packets to said first IOP module via said faulty one of said first and second switch fabrics and forwards all subsequent data packets to said first IOP module via the other one of said first and second switch fabrics.

12. The communication network as set forth in claim 11 wherein said first IOP module is capable of determining that a next expected data packet from said second IOP module was not received from said faulty one of said first and second switch fabrics and, in response to said determination, said first IOP module ceases forwarding data packets to said second IOP module via said faulty one of said first and second switch fabrics and forwards all subsequent data packets to said second IOP module via the other one of said first and second switch fabrics.

13. For use in a router comprising a first switch fabric, a second switch fabric and a plurality of routing nodes coupled to the first and second switch fabrics, each of the routing nodes comprising an input-output processing (IOP) module that forwards received data packets to other ones of the IOP modules via the first and second switch fabrics, a method of forwarding data packets comprising the steps of:
 receiving a stream of data packets in a first one of the IOP modules;
 identifying in the stream of data packets a first group of data packets directed to a second one of the IOP modules; and
 forwarding the first group of data packets from the first IOP module to the second IOP module by transmitting data packets in the first group alternately through the first and second switch fabrics for each sequential data packet directed to said second IOP module.

14. The method as set forth in claim 13 further comprising the steps of:
 identifying in the stream of data packets a second group of data packets directed to a third one of the IOP modules; and
 forwarding the second group of data packets from the first IOP module to the third IOP module by transmitting data packets in the second group alternately through the first and second switch fabrics.

15. The method as set forth in claim 14 wherein the alternate selection of the first and second switch fabrics for forwarding of the first group of data packets between the first and second IOP modules is independent of the alternate selection of the first and second switch fabrics for forwarding of the second group of data packets between the first and third IOP modules.

16. The method as set forth in claim 15 further comprising the step of determining in the second IOP module that a next expected data packet from the first IOP module was not received in an alternating manner from the first and second switch fabrics.

17. The method as set forth in claim 16 further comprising the steps, in response to the determination that the next expected data packet from the first IOP module was not received in an alternating manner from the first and second switch fabrics, of determining in the second IOP module that one of the first and second switch fabrics is faulty and ceasing forwarding data packets to the first IOP module via the faulty one of the first and second switch fabrics and forwarding all subsequent data packets to the first IOP module via the other one of the first and second switch fabrics.

18. The method as set forth in claim 17 further comprising the steps of:
- determining in the first IOP module that a next expected data packet from the second IOP module was not received from the faulty one of the first and second switch fabrics; and
- in response to the determination, ceasing forwarding data packets to the second IOP module via the faulty one of the first and second switch fabrics and forwarding all subsequent data packets to the second IOP module via the other one of the first and second switch fabrics.

19. A router for interconnecting a plurality of interfacing peripheral devices, said router comprising:
- a plurality of switch fabrics; and
- a plurality of routing nodes coupled to said plurality of switch fabrics, each of said routing nodes comprising an input-output processing (IOP) module capable of forwarding received data packets to other ones of said IOP modules via said plurality of switch fabrics, wherein a first one of said IOP modules forwards received data packets directed to a second one of said IOP modules by transmitting sequential data packets directed to said second IOP module in a round-robin manner through said plurality of switch fabrics.

20. The router as set forth in claim 19 wherein said first IOP module forwards received data packets directed to a third one of said IOP modules by transmitting sequential data packets directed to said third IOP module in a round-robin manner through said plurality of switch fabrics.

21. The router as set forth in claim 20 wherein said round-robin selection of said plurality of switch fabrics for forwarding of data packets between said first and second IOP modules is independent of said round-robin selection of said plurality of switch fabrics for forwarding of data packets between said first and third IOP modules.

22. The router as set forth in claim 21 wherein said second IOP module is capable of determining that a next expected data packet from said first IOP module was not received in a round-robin manner from said plurality of switch fabrics.

23. The router as set forth in claim 22 wherein said second IOP module, in response to said determination that said next expected data packet from said first IOP module was not received in a round-robin manner from said plurality of switch fabrics, determines that one of said plurality of switch fabrics is faulty and ceases forwarding data packets to said first IOP module via said faulty one of said plurality of switch fabrics and forwards all subsequent data packets to said first IOP module via the other ones of said plurality of switch fabrics in a round robin manner.

24. The router as set forth in claim 23 wherein said first IOP module is capable of determining that a next expected data packet from said second IOP module was not received from said faulty one of said plurality of switch fabrics and, in response to said determination, said first IOP module ceases forwarding data packets to said second IOP module via said faulty one of said plurality of switch fabrics and forwards all subsequent data packets to said second IOP module via the other ones of said plurality of switch fabrics in a round robin manner.

* * * * *